(12) United States Patent
Busaba et al.

(10) Patent No.: US 9,928,132 B2
(45) Date of Patent: Mar. 27, 2018

(54) DYNAMIC ACCESSING OF EXECUTION ELEMENTS THROUGH MODIFICATION OF ISSUE RULES

(71) Applicant: International Business Machines Corporation, Armonk, NY (US)

(72) Inventors: Fadi Y. Busaba, Poughkeepsie, NY (US); Steven R. Carlough, Wappingers Falls, NY (US); Christopher A. Krygowski, Lagrangeville, NY (US); Brian R. Prasky, Wappingers Falls, NY (US); Chung-Lung K. Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 295 days.

(21) Appl. No.: 14/501,326

(22) Filed: Sep. 30, 2014

(65) Prior Publication Data
US 2015/0019907 A1    Jan. 15, 2015

Related U.S. Application Data

(63) Continuation of application No. 13/741,985, filed on Jan. 15, 2013, now Pat. No. 9,304,848.

(51) Int. Cl.
*G06F 9/30* (2006.01)
*G06F 9/38* (2006.01)
(Continued)

(52) U.S. Cl.
CPC ...... *G06F 11/0793* (2013.01); *G06F 9/30145* (2013.01); *G06F 9/3836* (2013.01);
(Continued)

(58) Field of Classification Search
CPC .. G06F 9/30145; G06F 9/3836; G06F 9/3861; G06F 11/0721; G06F 11/0793; G06F 11/2035
See application file for complete search history.

(56) References Cited

U.S. PATENT DOCUMENTS 6,021,511 A * 2/2000 Nakano ................. G06F 11/006
                                                                714/10
6,694,425 B1   2/2004 Eickemeyer
(Continued)

FOREIGN PATENT DOCUMENTS

JP   2008217665 A   9/2008
WO   2010023756 A1  3/2010

OTHER PUBLICATIONS

Anderson, t.-et al.; "Requirements for the Dynamic Partitioning of Switching Elements"; http://www.ip.com/pubview/IPCOM000012512D; May 1, 2003.
(Continued)

*Primary Examiner* — Benjamin Geib
(74) *Attorney, Agent, or Firm* — Cantor Colburn LLP; William A. Kinnaman, Jr.

(57) ABSTRACT

Embodiments of the invention relate to dynamically routing instructions to execution units based on detected errors in the execution units. An aspect of the invention includes a computer system including a processor having an instruction issue unit and a plurality of execution units. The processor is configured to detect an error in a first execution unit among the plurality of execution units and adjust instruction dispatch rules of the instruction issue unit based on detecting the error in the first execution unit to restrict access to the first execution unit while leaving un-restricted access to the remaining execution units of the plurality of execution units.

8 Claims, 6 Drawing Sheets

(51) Int. Cl.
*G06F 11/07* (2006.01)
*G06F 11/20* (2006.01)

(52) U.S. Cl.
CPC ........ *G06F 9/3861* (2013.01); *G06F 11/0721* (2013.01); *G06F 11/2035* (2013.01); *G06F 11/079* (2013.01); *G06F 11/0724* (2013.01); *G06F 11/2025* (2013.01); *G06F 11/2043* (2013.01)

(56) References Cited

U.S. PATENT DOCUMENTS

| | | | |
|---|---|---|---|
| 6,871,298 B1 | 3/2005 | Cavanaugh et al. | |
| 7,185,225 B2* | 2/2007 | Sutardja | H01L 22/22 257/E21.526 |
| 7,934,203 B2 | 4/2011 | Lovett et al. | |
| 2005/0071406 A1* | 3/2005 | Luick | G06F 11/2043 708/490 |
| 2009/0044049 A1* | 2/2009 | Luick | G06F 9/30101 714/11 |
| 2009/0049336 A1 | 2/2009 | Hara | |

OTHER PUBLICATIONS

Anonymous; "Automatic resource allocation basde on an adaptive application profile environment to optimize computing resources"; http://priorartdatabase.com/IPCOM000208686D; Jul. 15, 2011.

IBM; "Process for Dynamic Discovery of Managed Resource and Autonomic Manager Instances Through a Well-Defined Common Base Event"; http://www.ip.com/pubview/IPCOM000147302D;- Mar. 9, 2007.

International Search Report and Written Opinion for related PCT Application No. PCT/IB2013/061067, dated Apr. 8, 2014, pp. 1-6.

Smitha Shyam; et al. "Ultra Low-Cost Defect Protection for Microprocessor Pipelines"; Adavanced Computer Architect Lab; University of Michagan, Ann Arbor, MI 48109; 10 pages.

* cited by examiner

DYNAMIC ACCESSING OF EXECUTION ELEMENTS THROUGH MODIFICATION OF ISSUE RULES

DOMESTIC PRIORITY

This application is a continuation of U.S. patent application Ser. No. 13/741,985, filed Jan. 15, 2013, the disclosure of which is incorporated by reference herein in its entirety.

BACKGROUND

The present invention relates generally to routing instructions to execution units in a processing circuit, and more specifically, to detecting hardware errors in the execution units and modifying issue rules to avoid routing instructions to the execution units having hardware errors.

In computing, a pipeline may be considered as a set of data processing elements connected in series, so that the output of one element is the input of the next one. At an issue stage of a pipeline, an instruction issue unit receives an instruction, such as a decoded instruction from a decoding stage, and dispatches the instruction to an execution unit. The execution stage of the pipeline may include various execution units including floating point execution units, fixed point execution units, load/store execution units, and others, according to the design specifications of the processing circuit.

When a hardware error is detected in the execution stage, such as a stuck bit, flipped bit, stalled state, or other hardware error, the execution stage cannot be relied upon to execute instructions with accuracy, and the processing circuit may be shut down. For example, the instructions may be routed to another processor or another processing core of a multi-core processor. The processor or processing circuit including the error may require replacement to return to functionality.

SUMMARY

Exemplary embodiments include a computer system for executing instructions including a processor including an instruction issue unit and a plurality of execution units. The processor is configured to perform a method including detecting an error in a first execution unit among the plurality of execution units and adjusting instruction dispatch rules of the instruction issue unit based on detecting the error in the first execution unit to restrict access to the first execution unit while leaving un-restricted access to the remaining execution units of the plurality of execution units.

Additional exemplary embodiments include a computer-implemented method for instruction execution. The method includes detecting, by a computer, an error in a first execution unit among a plurality of execution units of a processing circuit and adjusting, by the computer, instruction dispatch rules of an instruction issue unit of the processing circuit based on detecting the error in the first execution unit to restrict access to the first execution unit while leaving un-restricted access to the remaining execution units of the plurality of execution units.

Further exemplary embodiments include a computer program product for instruction execution. The computer program product includes a tangible storage medium readable by a processing circuit including a plurality of execution units and storing instructions for execution by the processing circuit for performing a method. The method includes detecting by the processing circuit an error in a first execution unit among the plurality of execution units and adjusting by the processing circuit instruction dispatch rules of an instruction issue unit based on detecting the error in the first execution unit to restrict access to the first execution unit while leaving un-restricted access to the remaining execution units of the plurality of execution units.

Further exemplary embodiments include a processor including a plurality of execution units configured to execute instructions, an instruction issue unit configured to receive the instructions and route the instructions to one of the plurality of execution units based on instruction dispatch rules, and an error detection unit configured to detect an error in a first execution unit among the plurality of execution units and to adjust the instruction dispatch rules of the instruction issue unit based on the detected error to restrict access to the first execution unit while leaving un-restricted access to the remaining execution units of the plurality of execution units.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In exemplary embodiments, an error is detected in an execution stage and isolated to a particular execution unit. Issue rules are then adjusted to route instructions that would have been directed to the execution unit to alternative execution units, or to an execution sub-unit within the execution unit that is not affected by the error. Accordingly, even when a hardware error is detected in an execution stage, the execution stage may still be utilized to execute instructions.

Figure 1:
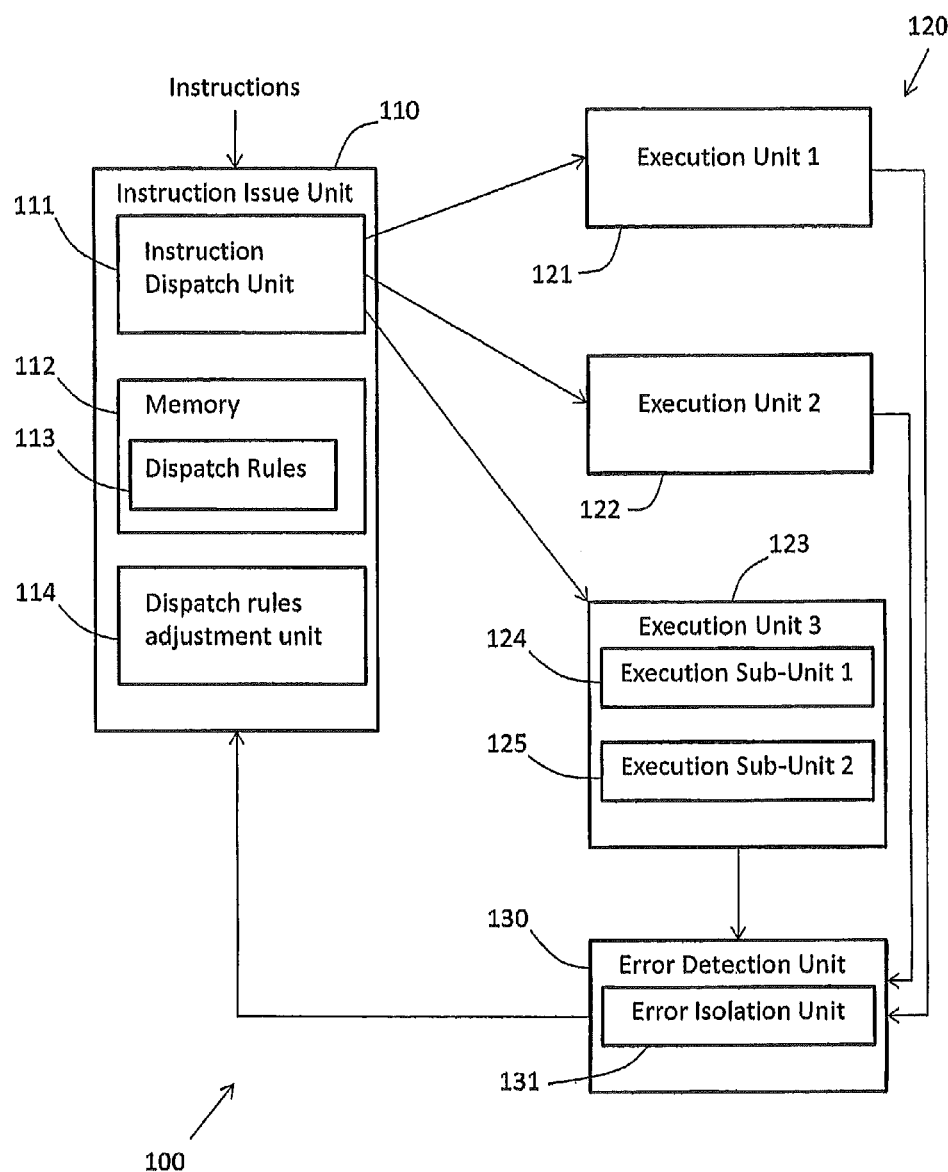
FIG. 1 illustrates an instruction routing system according to an embodiment of the invention.

FIG. 1 illustrates a block diagram an instruction routing system 100 according to one embodiment of the present invention. The instruction routing system 100 includes an instruction issue unit 110 and an execution stage 120. The instruction issue unit 110 is configured to receive instructions, such as decoded instructions, and to route the instructions to an appropriate execution unit based on the type of instruction or operation being performed. In particular, the instruction issue unit 110 includes an instruction dispatch unit 111 and memory 112. The memory 112 may store dispatch rules 113, also referred to as instruction dispatch rules or issue rules, and the instruction dispatch unit 111 routes instructions to an appropriate execution unit based on the dispatch rules 113 stored in memory 112. In embodiments of the present invention, the memory 112 may include any type of volatile or non-volatile data storage device, chip, or portion of a chip.

When the instruction issue unit 110 receives an instruction, characteristics of the instruction are determined. For example, a type of instruction may be determined. Dispatch rules 113 may control the instruction dispatch unit 111 to route the instruction to an appropriate execution unit based on the detected instruction characteristic. For example, a first type of instruction may be routed to a first execution unit 121 and a second type of instruction may be routed to another execution unit 123.

The execution stage 120 may include a plurality of execution units 121, 122 and 123 (also described as functional units 121, 122 and 123). Each execution unit 121, 122 and 123 may include, for example, registers, logic, and other circuitry to perform a particular function. Some examples of types of execution units include fixed point execution units, floating point execution units, load/store execution units, and vector execution units. However, these execution units are merely provided as examples, and it is understood that any number and type of execution units may be provided in a processing circuit according to the requirements of the system implementing the processing circuit.

The instruction dispatch unit 111 transmits the instruction to an execution unit 121, 122, or 123 based on the dispatch rules 113. The dispatch rules 112 may select execution units for receipt of instructions based on the type of instruction, instruction flow programming, or any other consideration. In one embodiment, execution units 121, 122, and 123 are all different types of execution units for executing different types of instructions. In another embodiment, execution units 121 and 122 are the same type of execution unit and may be configured to execute instructions in parallel, as received from the instruction issue unit 110 or from multiple instruction issue units. In the present specification and claims, the term parallel execution units refers to two or more execution units that perform the same function, such as two or more load/store execution units, two or more floating point execution units, etc. Although only two execution units 121 and 122 are illustrated in FIG. 1 as being potentially parallel execution units, it is understood that embodiments of the invention encompass any number and any type of parallel execution units.

One or more execution units, such as execution unit 123 may include execution sub-units. For example, execution unit 123 is illustrated as including execution sub-units 124 and 125. The execution sub-units 124 and 125 may be configured to perform different, but related, functions. For example, the execution unit 123 may be an arithmetic execution unit, execution sub-unit 124 may be a multiplication sub-unit, and execution sub-unit 125 may be an addition/subtraction sub-unit. While only one execution unit 123 having multiple sub-units 124 and 125 is illustrated in FIG. 1, it is understood that embodiments of the invention encompass any number and any type of execution units having multiple execution sub-units that perform separate, but related, functions.

The error detection unit 130 may detect an error in the execution stage 120. In one embodiment, each execution unit 121, 122, and 123 includes an error identification circuit, program, or mechanism. The error identification circuit, program, or mechanism may be associated exclusively with the respective execution unit 121, 122, and 123, such as by being built in to a circuit defining a respective execution unit 121, 122, or 123 or written into a program associated with a respective execution unit 121, 122, or 123. In another embodiment, the error detection unit 130 is separate from the execution units 121, 122, and 123 and monitors all of the execution units 121, 122, and 123 for errors. In embodiments of the present invention, the errors may be hardware errors in the execution units 121, 122 and 123, such as a stuck bit, a flipped bit, a stalled hardware state, or any other hardware error. The errors may be detected by bit parity analyses, comparison of hardware states to known valid states, detection of a stalled state in an execution unit, or by any other hardware error detection method.

The error detection unit 130 includes an error isolation unit 131 configured to identify the particular execution unit 121, 122 or 123 that is the source of the hardware error, or the execution sub-unit 124 or 125 that is the source of the hardware error. In one embodiment, each execution unit 121, 122, and 123 includes a separate error detection mechanism that transmits error information to the error detection unit 130. The error isolation unit 131 may determine the source of the error based on the received error information.

The error detection unit 130 transmits data including the particular execution unit 121, 122 or 123, or the particular execution sub-unit 124 or 125 to a dispatch rules adjustment unit 114. The dispatch rules adjustment unit 114 analyzes the data including the particular execution unit or execution sub-unit that is the source of a hardware error, generates one or more replacement dispatch rules or adjusted dispatch rules, and replaces one or more existing dispatch rules in memory 112 with the replacement or adjusted dispatch rules.

In particular, the dispatch rules adjustment unit 114 generates one or more dispatch rules to prevent access of instructions to the execution unit that is the source of the detected error. In addition, when the execution unit that is the source of the hardware error is one of a plurality of parallel execution units that perform a same function, the dispatch rules adjustment unit 114 generates a replacement dispatch rule 113 that prevents access to the execution unit having the hardware error and re-routes instructions to one or more parallel execution units in which no error has been detected. In addition, if the dispatch rules adjustment unit 114 determines that an error exists in one execution sub-unit 124 but not in another execution sub-unit 125 of an execution unit 123, the dispatch rules adjustment unit 114 may generate a replacement dispatch rule that prevents routing instructions to the execution sub-unit 124 but continues to allow routing of instructions to the execution sub-unit 125.

For example, in an embodiment in which four execution units are provided as load/store execution units, dispatch rules may exist to route instructions to the respective load/store execution units sequentially in a round-robin or looping order. When it is determined that one of the four load/store execution units is faulty, the dispatch rules adjustment unit 114 may adjust the dispatch rules to omit the faulty load/store execution unit from the loop of load/store execution units eligible to receive instructions.

While the dispatch rules adjustment unit 114 is illustrated in FIG. 1 as being part of the instruction issue unit 110, it is understood that the dispatch rules adjustment unit 114 may be part of the error detection unit 130 or part of a separate device, circuit, or executable program stored in memory and executed by a processor.

According to embodiments of the present invention, even when one or more execution units 121, 122 or 123, or execution sub-units 124 or 125 are inoperable due to hardware errors, one or more additional executions may still be operated to receive instructions by adjusting dispatch rules 113 of instruction issue unit 110. Accordingly, a processing circuit may continue operating even after suffering a hardware error.

Figure 2:
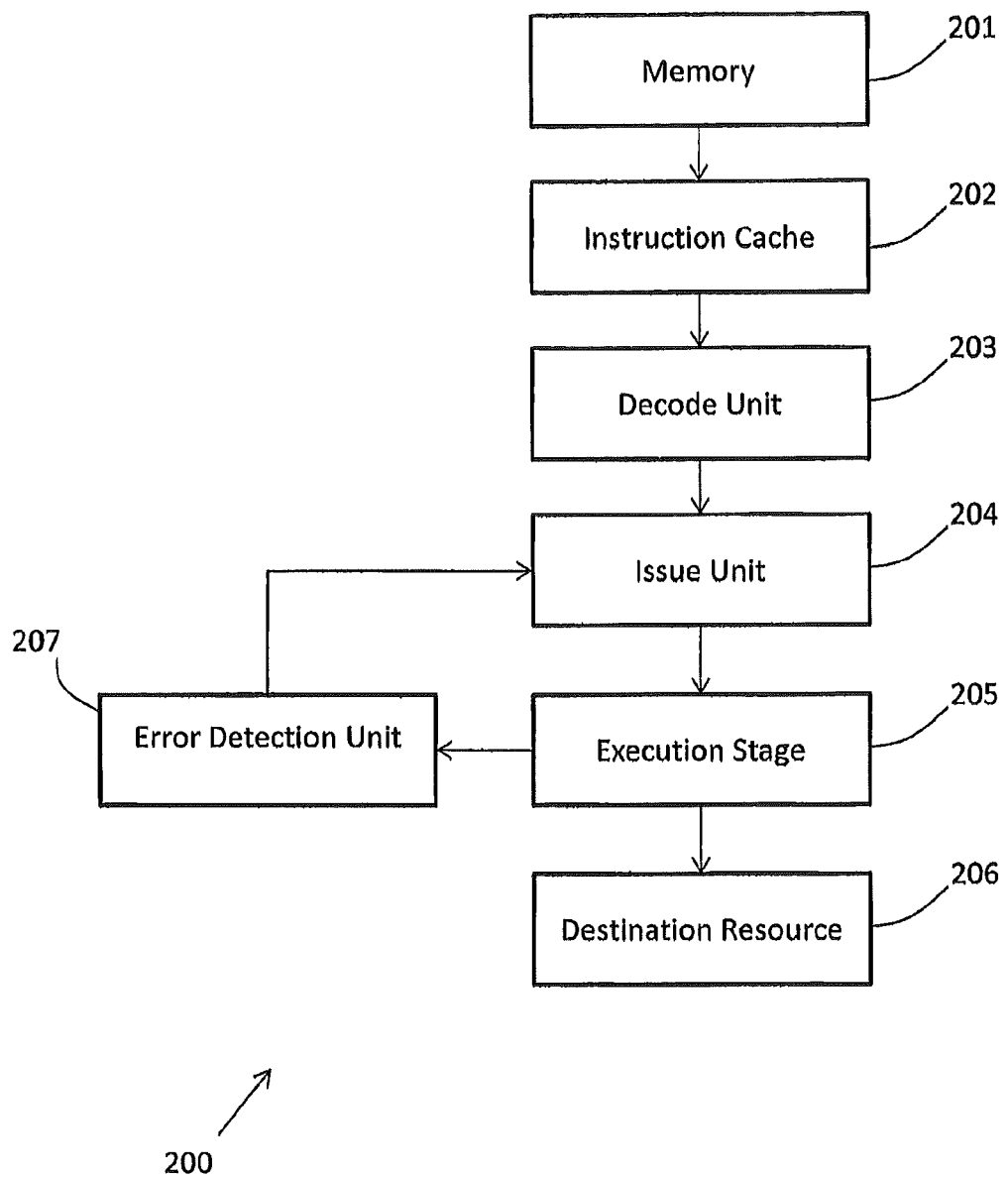
FIG. 2 illustrates a processing circuit according to an embodiment of the invention.

FIG. 2 illustrates a processing circuit 200 according to embodiments of the present disclosure. The processing circuit may correspond, for example, to an instruction pipeline of a processor, and the processor may include multiple instruction pipelines. For example, the processing circuit may correspond to a multi-threading processor, a simultaneous multi-threading processor, a core of a multi-core processor, or any other type of processor configured to route instructions to particular execution units based on dispatch rules.

Instructions and data may be stored in memory 201, and the instruction cache 202 may access instructions in memory 201 and store the instructions for decoding. The memory 201 may include any type of volatile or non-volatile memory, such as cache memory. The memory 201 and instruction cache 202 can include multiple cache levels. The decode unit 203 decodes the instructions and transmits the decoded instructions, portions of instructions, or other decoded data to the issue unit 204. The issue unit 204 analyzes the instructions or other data and transmits the decoded instructions, portions of instructions, or other data to a particular execution unit in the execution stage 205 based on the analysis. The execution stage 205 transmits the results of the executed instruction, portion of instruction, or other decoded data to a destination resource 206.

The destination resource 206 may be any type of resource, including registers, cache memory, other memory, I/O circuitry to communicate with other devices, other processing circuits, or any other type of destination for executed instructions or data. An error detection unit 207 detects hardware errors in the execution stage 205 and controls the issue unit 204 to adjust routing of the instructions based on the detected errors. In particular, the issue unit 204, execution stage 205, and error detection unit 207 may correspond to the instruction issue unit 110, execution stage 120, and error detection unit 130, respectively, of FIG. 1. Accordingly, the error detection unit 207 may detect a particular execution unit of execution stage 205 that is the source of an error and may adjust dispatch rules of the issue unit 204 to route instructions away from an execution unit having an error and toward a parallel execution unit or other execution sub-unit of the execution unit, as described previously with respect to FIG. 1.

Figure 3A:
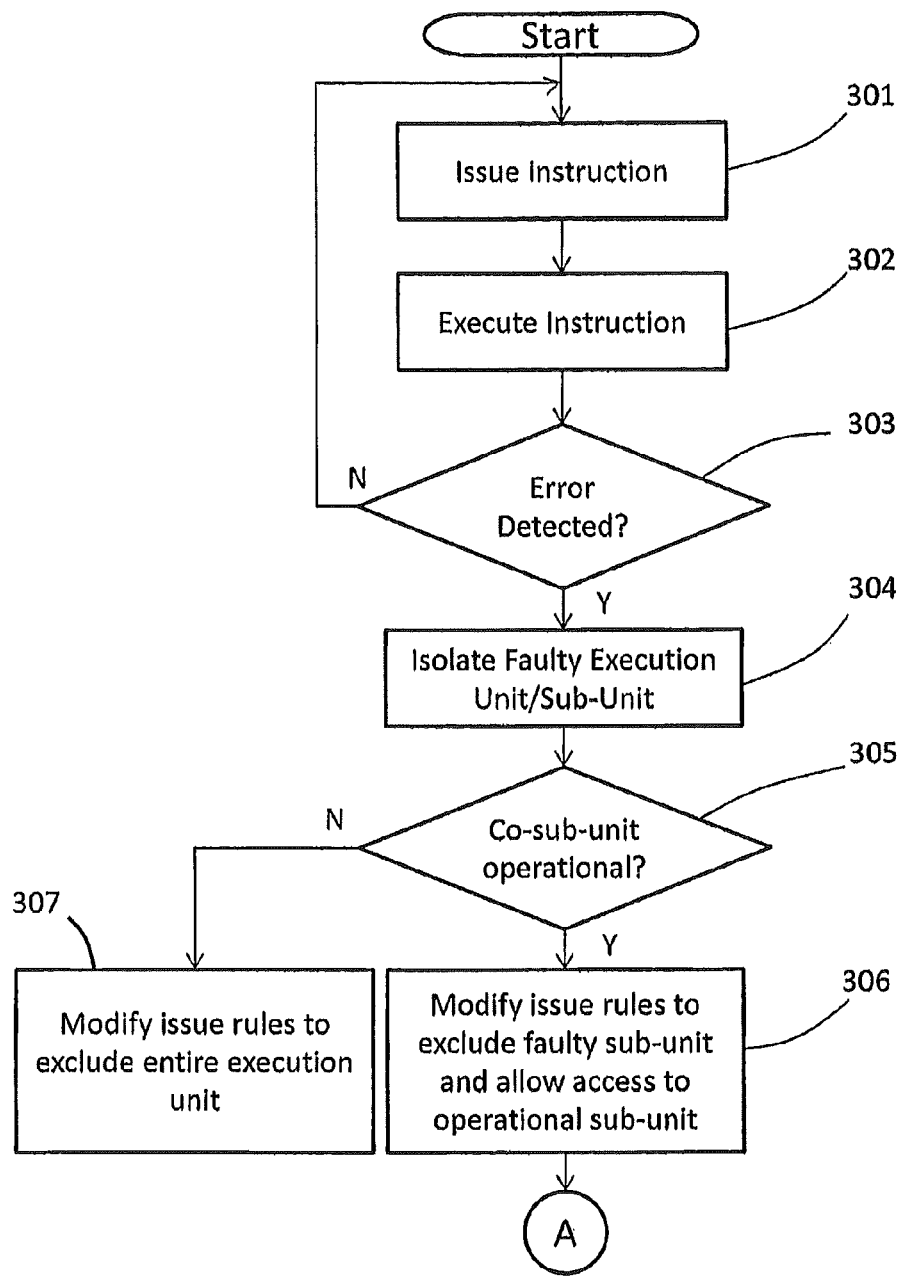
FIGS. 3A and 3B are a flowchart illustrating a method of dynamically routing instructions according to an embodiment of the invention.
Figure 3B:
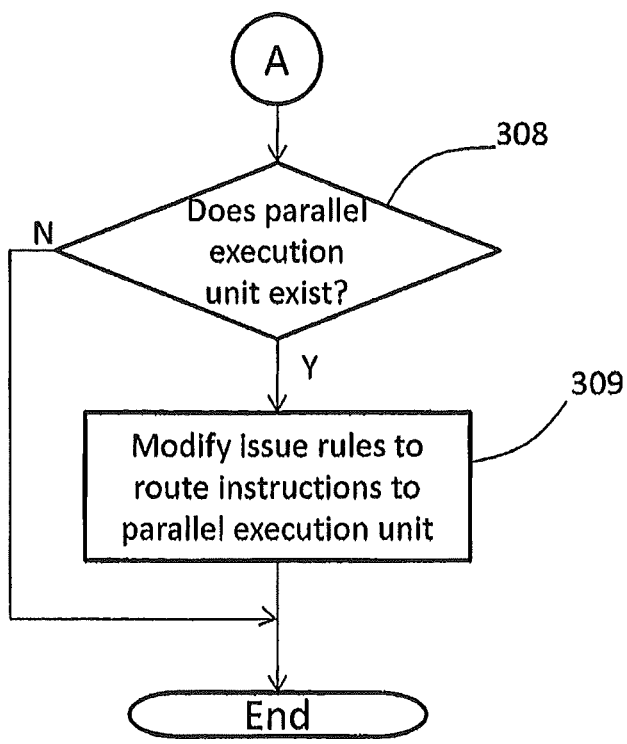

FIGS. 3A and 3B illustrate a method according to one embodiment of the present invention. In block 301 an instruction is issued to an execution unit, and in block 302 the instruction is executed. In block 303, it is determined whether an error is detected in an execution unit. If no error is detected, the instructions continue to issue and execute without adjusting dispatch rules.

On the other hand, if it is determined in block 303 that a hardware error exists in an execution unit, the faulty execution unit is isolated in block 304. In particular, one or more execution units having a hardware error are identified and the remaining execution units are identified as having no error detected. In addition, it is determined whether the error corresponds to only a portion of an execution unit, such as an execution sub-unit.

In block 305, it is determined whether a co-sub-unit is operational. In other words, if it is determined that the error corresponds to an execution sub-unit of an execution unit, then it is determined in block 305 whether no error is detected in at least one other execution sub-unit of the execution unit. If it is determined in block 305 that at least one other execution sub-unit of the faulty execution unit has no error, then the dispatch rules (also referred to as issue rules) are modified to prevent routing instructions to a faulty execution sub-unit and to allow routing instructions to the execution sub-unit in which no error is detected. On the other hand, if it is determined in block 305 that there is no non-faulty execution sub-unit, then in block 307 the issue rules may be modified to prevent routing instructions to the entire execution unit in which the error is detected.

In block 308, it is determined whether the faulty execution unit is one of a plurality of parallel execution units, or executions that perform the same function. If so, then in block 309, the issue rules are modified to route instructions to another one of the parallel execution units instead of the faulty execution unit.

Figure 4:
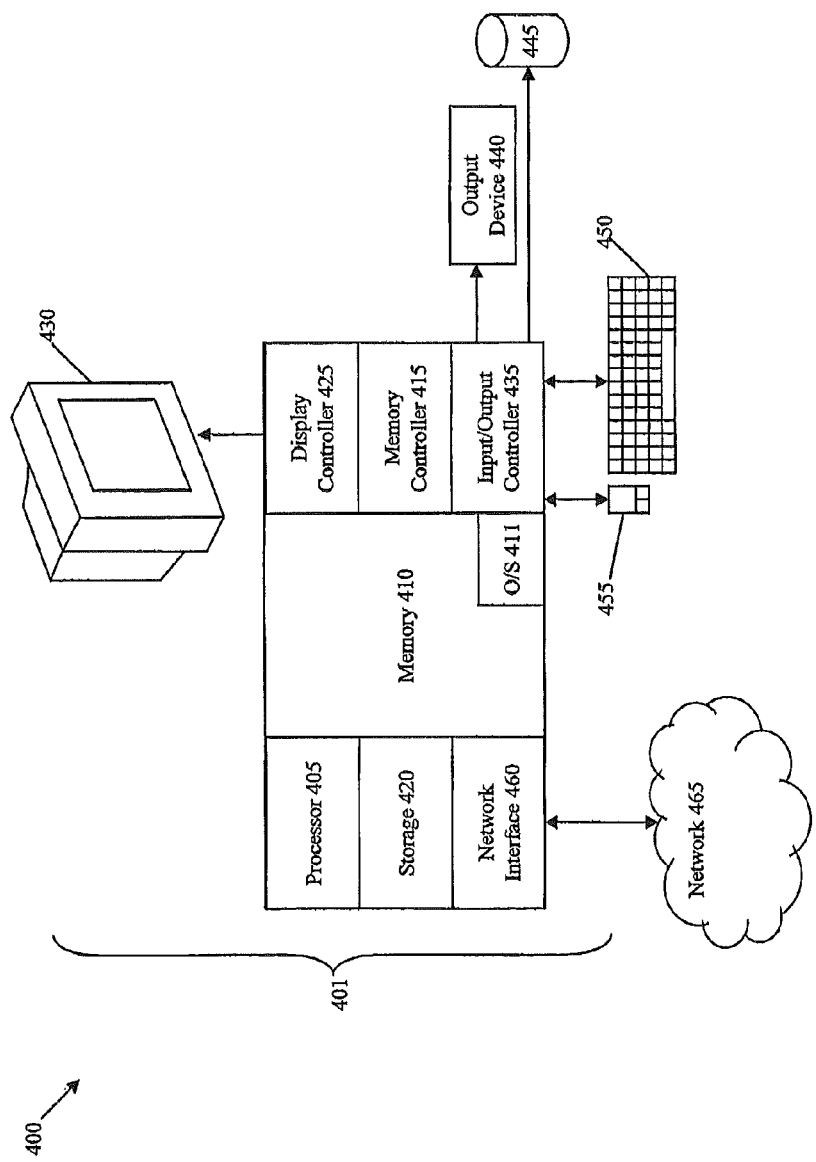
FIG. 4 illustrates a computing system according to an embodiment of the invention.

FIG. 4 illustrates a block diagram of a system 400 for adjusting dispatch rules based on errors detected in an execution stage of a processor 405. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 400 therefore includes general-purpose computer 401 as illustrated in FIG. 4.

In an exemplary embodiment, in terms of hardware architecture, as shown in FIG. 4, the computer 401 includes a processor 405 including a plurality of execution units, an error detection unit, a dispatch rules adjustment unit, and an instruction dispatch unit. The computer 401 further includes memory 410 coupled to a memory controller 415, and one or more input and/or output (I/O) devices 440, 445 (or peripherals) that are communicatively coupled via a local input/output controller 435. The input/output controller 435 can be, for example but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions.

The memory 410 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The instructions in memory 410 may include one or more separate programs, each of which comprises an ordered listing of executable instructions for implementing logical functions. In the example of FIG. 4, the instructions in the memory 410 a suitable operating system (OS) 411. The operating system 411 essentially controls the execution of other computer programs and provides scheduling, input-output control, file and data management, memory management, and communication control and related services.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the instructions in the memory 410 may further include a basic input output system (BIOS) (omitted for simplicity). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute instructions stored within the memory 410, to communicate data to and from the memory 410, and to generally control operations of the computer 401 pursuant to the instructions.

In an exemplary embodiment, where execution unit error detection and dispatch rules adjustment is implemented in hardware, the dispatch rules adjustment methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
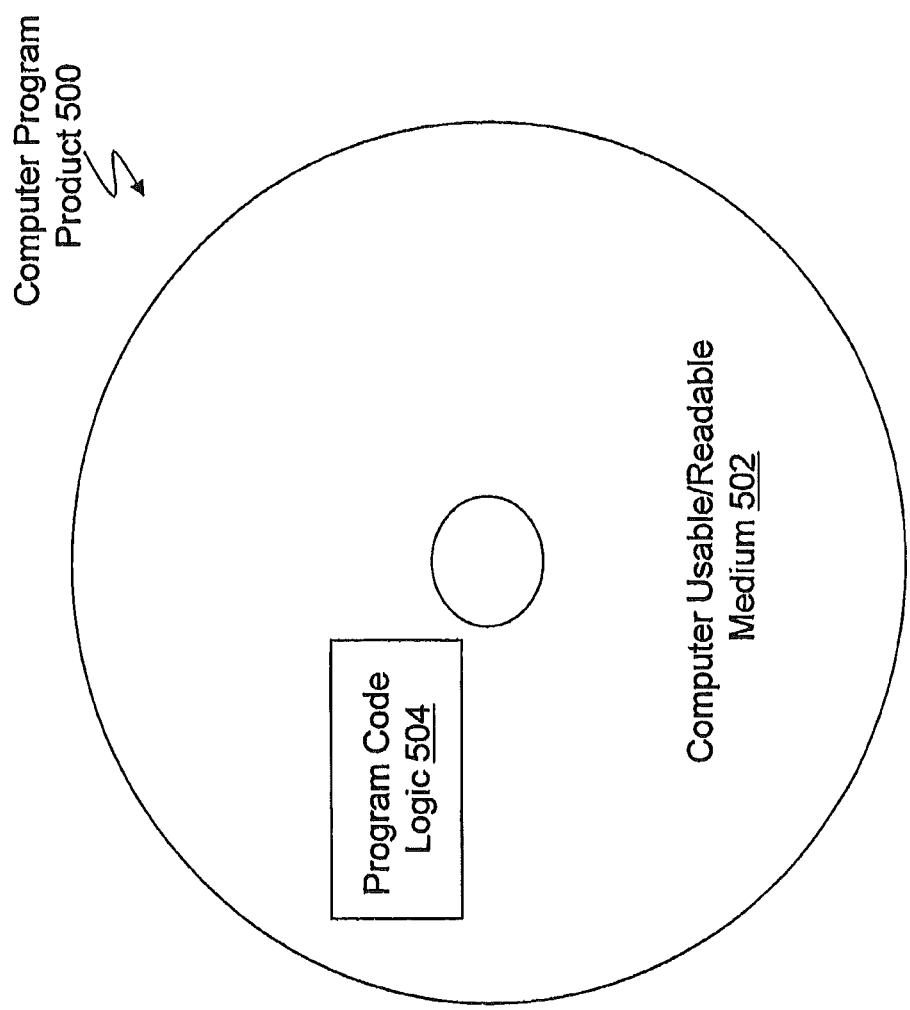
FIG. 5 illustrates a computer-readable medium according to an embodiment of the invention.

As described above, embodiments can be embodied in the form of computer-implemented processes and apparatuses for practicing those processes. An embodiment may include a computer program product 500 as depicted in FIG. 5 on a computer readable/usable medium 502 with computer program code logic 504 containing instructions embodied in tangible media as an article of manufacture. Exemplary articles of manufacture for computer readable/usable medium 502 may include floppy diskettes, CD-ROMs, hard drives, universal serial bus (USB) flash drives, or any other computer-readable storage medium, wherein, when the computer program code logic 504 is loaded into and executed by a computer, the computer becomes an apparatus for practicing the invention. Embodiments include computer program code logic 504, for example, whether stored in a storage medium, loaded into and/or executed by a computer, or transmitted over some transmission medium, such as over electrical wiring or cabling, through fiber optics, or via electromagnetic radiation, wherein, when the computer program code logic 504 is loaded into and executed by a computer, the computer becomes an apparatus for practicing the invention. When implemented on a general-purpose microprocessor, the computer program code logic 504 segments configure the microprocessor to create specific logic circuits.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for instruction execution, the method comprising:

detecting, by an error detection unit included in a computer, an error in a first execution unit among a plurality of execution units of a processing circuit, wherein the first execution unit includes at least a first execution sub-unit and a second execution sub-unit, and the error detection unit installed remotely from the plurality of execution units;

receiving instructions that are executable by at least one execution unit among the plurality of execution units;

identifying at least one characteristic of the instructions, matching the at least one characteristic to an execution unit capable of executing a given instruction, and dispatching the given instruction to a corresponding execution unit based on an instruction dispatch rule that controls routing of the given instruction;

in response to determining the corresponding execution unit is the first execution unit including the error, adjusting, by the computer, at least one of the instruction dispatch rules of an instruction issue unit based on detecting the error in the first execution unit to generate a replacement dispatch rule, the replacement dispatch rule re-routing the given instruction so as to restrict access to the first execution unit while leaving un-restricted access to the remaining execution units of the plurality of execution units;

determining that the error is associated with the first execution sub-unit and the error is not associated with the second execution sub-unit; and adjusting the instruction dispatch rules of the instruction issue unit to prevent routing of instructions to the first execution sub-unit and to allow routing of instructions to the second execution sub-unit.

2. The computer-implemented method of claim 1, further comprising:

determining whether the first execution unit is one of a plurality of parallel execution units for performing a same type of instruction execution; and adjusting the instruction dispatch rules of the instruction issue unit to prevent routing of instructions to the first execution unit in which the error is detected and to route instructions to another one of the plurality of parallel execution units in which no error is detected.

3. The computer-implemented method of claim 1, wherein the computer includes an error detection unit configured to detect the error and to isolate the first execution unit in which the error is detected from among the plurality of execution units.

4. The computer-implemented method of claim 1, wherein the error is a hardware error in the first execution unit.

5. A computer program product for instruction execution, the computer program product comprising:

a tangible storage medium readable by a processing circuit including a plurality of execution units and storing instructions for execution by the processing circuit for performing a method comprising:

detecting, by an error detection unit included with the processing circuit, an error in a first execution unit among the plurality of execution units, wherein the first execution unit includes at least a first execution sub-unit and a second execution sub-unit, and the error detection unit installed remotely from the plurality of execution units;

receiving instructions that are executable by at least one execution unit among the plurality of execution units;

identifying at least one characteristic of the instructions, matching the at least one characteristic to an execution unit capable of executing a given instruction, and dispatching the given instruction to a corresponding execution unit based on an instruction dispatch rule that controls routing of the given instruction;

in response to determining the corresponding execution unit is the first execution unit including the error, adjusting, by the processing circuit, at least one of the instruction dispatch rules of an instruction issue unit based on detecting the error in the first execution unit to generate a replacement dispatch rule, the replacement dispatch rule re-routing the given instruction so as to restrict access to the first execution unit while leaving un-restricted access to the remaining execution units of the plurality of execution units;

determining that the error is associated with the first execution sub-unit and the error is not associated with the second execution sub-unit; and adjusting the instruction dispatch rules of the instruction issue unit to prevent routing of instructions to the first execution sub-unit and to allow routing of instructions to the second execution sub-unit.

6. The computer program product of claim 5, wherein the method further comprises:

determining whether the first execution unit is one of a plurality of parallel execution units for performing a same type of instruction execution; and adjusting the instruction dispatch rules of the instruction issue unit to prevent routing of instructions to the first execution unit in which the error is detected and to route instructions to another one of the plurality of parallel execution units in which no error is detected.

7. The computer program product of claim 5, wherein the processing circuit includes an error detection unit configured to detect the error and to isolate the first execution unit in which the error is detected.

8. The computer program product of claim 5, wherein the error is a hardware error in the first execution unit.

\* \* \* \* \*